United States Patent [19]

Tiggelbeck

[11] Patent Number: 5,167,804
[45] Date of Patent: Dec. 1, 1992

[54] LIQUID TREATMENT SYSTEM
[75] Inventor: Donald D. Tiggelbeck, Pittsburgh, Pa.
[73] Assignee: Tigg Corporation, Pittsburgh, Pa.
[21] Appl. No.: 700,776
[22] Filed: May 16, 1991
[51] Int. Cl.[5] ............................................. B01D 36/02
[52] U.S. Cl. .................................. 210/167; 210/182;
210/195.1; 210/196; 210/257.1; 210/259;
210/266; 210/287; 210/314; 210/909
[58] Field of Search ............. 174/14 R; 210/167, 181,
210/182, 184, 186, 195.1, 196, 257.1, 259, 266,
287, 289, 314, 909

[56] References Cited
U.S. PATENT DOCUMENTS 4,124,834 11/1978 Walsh ............................... 174/14 R
4,302,335 11/1981 Habermas ............................ 210/266
4,379,750 4/1983 Tiggelbeck ......................... 210/289

Primary Examiner—Ivars Cintins
Attorney, Agent, or Firm—Harry B. Keck

[57] ABSTRACT

Apparatus for removing a contaminant from a container having a liquid inventory including the contaminant as a minor ingredient and having an elevated temperature at the top of the liquid inventory. A treatment vessel contains a supply of particulate adsorbent for the contaminant. A first conduit connects the top of the container with the treatment vessel. A second conduit connects the treatment vessel with the bottom of the container. The temperature difference between the top and bottom of liquid in the container provides the driving force for continuing movement of liquid from the top of the container through the first conduit, the treatment vessel and the second conduit back to the bottom of the container. The apparatus is particularly useful for removing PCB from retrofilled transformers containing minor quantities of PCB.

18 Claims, 3 Drawing Sheets

LIQUID TREATMENT SYSTEM

BACKGROUND OF THE INVENTION

1. Field of the Invention

This invention relates to a method and apparatus for continuing treatment of a liquid inventory in order to remove a selected ingredient from the inventory. More particularly the invention concerns a method and apparatus for continuing removal of PCBs (polychlorinated biphenyls) from a transformer in which a PCB containing transformer fluid has been replaced with a non-PCB transformer fluid.

2. Description of the Prior Art

Many transformers were manufactured with 40-70 weight percent PCBs (polychlorinated biphenyls) in trichlorobenzene solvent ("askerel" fluid) as the transformer fluid which functions as a coolant/insulator. Recognition of the hazards of PCB has resulted in laws and regulations which (a) ban use of PCB as a transformer fluid in new transformers; (b) require removal of PCB transformers fluid in certain applications such as food processing applications and replacement of the PCB transformer fluid with a non-PCB fluid such as silicone; and (c) require that treated transformers maintain a low PCB content in the transformer fluid after a 90 day period following the treatment, e.g., less than 50 parts of PCB by weight per million parts of fluid to be classified as "non-PCB". Another "PCB-contaminated" transformer classification permits up to 500 ppm PCB content in the transformer fluid.

If the PCB concentration in retrofilled transformer fluid tests less than 50 ppm or 500 ppm after the required waiting period, the transformer qualifies for reclassification and continued use. Within 2 to 3 years following reclassification, the PCB concentration (initially less than 50 ppm) may rise to 250 to 300 ppm as a result of gradual leaching from wooden components and interior surfaces, or may rise over 500 ppm in transformers which originally test below that level. A typical state-of-art resolution is to replace some or all of the transformer fluid with fresh silicone oil to re-establish an acceptable reclassification concentration. Such replacements may be carried out several times. If the transformer had been retrofilled with a chlorinated solvent instead of silicone, distillation equipment may be brought to the transformer site to effect the desired reduction in PCB level.

A service industry has developed for replacing PCB transformers fluids with silicone fluids. See U.S. Pat. No. 4,124,834 which describes the replacement of PCB transformer fluid with silicone oil and recognizes that there is ongoing leakage of residual PCB (from the fibrous and solid insulating materials in the transformer) into the silicone oil. The patent further describes a treatment vessel which continuously treats a side stream of the transformer fluid inventory with activated carbon in an external housing by moving the side stream from the transformer tank through an activated carbon bed to permit the adsorption of PCB on the activated carbon. The treated silicone fluid is returned to the transformer tank. Movement of the fluid may result from thermal siphon phenomena or from a pump in the fluid piping. As a result of this operation, the PCB content of the silicone transformer fluid in the retrofilled transformer can be maintained below the maximum value permitted by law and regulations.

It may be desirable to continue treatment of the transformer fluid for many years because of the continuing gradual leaching and extraction of residual PCB from the retrofilled transformer.

STATEMENT OF THE INVENTION

According to the present invention, a continuing treatment apparatus can be installed above or adjacent to a retrofilled transformer for continuing treatment of a portion of the transformer fluid inventory without requiring pumps or outside power sources for its operation. This is accomplished by taking advantage of the vertical temperature gradient which exists in a transformer, i.e., the transformer fluid at the top of the transformer casing or container is relatively warm whereas the transformer fluid at the bottom of the transformer casing is relatively cool. A function of the transformer fluid is to absorb heat from the electrical coils within the transformer casing and release the heat to the atmosphere or elsewhere. Hence the transformer fluid is in constant convection motion while the transformer is operating.

According to this invention, the warm transformer fluid moves upwardly through a conduit which enters the transformer casing above the transformer fluid inventory. This important feature permits the improved apparatus to be installed without draining any of the transformer fluid from the transformer.

Another improvement of this invention provides thermal insulation for the transformer fluid conduit which receives the transformer fluid upwardly from the transformer inventory. A further improvement of this invention provides heating means such as heating tape wrapped around the transformer fluid conduit to supplement the temperature difference in transformer fluid and thereby improve the operation of the thermal siphon.

The continuing treatment apparatus of this invention can be installed in an existing transformer without requiring that the transformer fluid be drained. By employing the thermal siphon principle to achieve movement of the transformer fluid into the treatment vessel, no pumps are required to obtain continuing treatment.

The expressions "continuing", "continuous" and "intermittent" are used in this specification with the following accepted definitions:

"Continuous" operation defines uninterrupted operation, except for periods of planned or unplanned inactivity.

"Intermitten" operation defines operation which is intentionally terminated and intentionally resumed as desired.

"Continuing" operation is intended to include long term operation, whether "continuous" operation or "intermittent" operation.

According to the invention, a treatment vessel is positioned above or adjacent to the retrofilled transformer. A first conduit means extends upwardly from the interior of the transformer, beginning just below the liquid level of transformer fluid and communicates with the treatment vessel. The treatment vessel contains an inventory of adsorbent material such as activated carbon which selectively adsorbs PCB from solutions containing silicone oil and PCB. A second conduit means extends from the treatment vessel back to the transformer and is introduced into the base of the transformer, preferably through a valved Tee connection with the transformer fluid outlet tap. The transformer fluid from the transformer rises through the first conduit means, passes through the bed of treating material and returns to the transformer through the second conduit means. During passage through the bed of treating material, the PCB ingredients are absorbed and the remaining fluid is unchanged. As a result, the returned fluid has a lower PCB concentration than the transformer inventory. The thermal gradient across the transformer also is presented between the transformer end of the first conduit means and the transformer end of the second conduit means. A thermal siphon driving force is presented which achieves continuous movement of transformer fluid through the treatment vessel. No pumps are required.

In a preferred embodiment, the first conduit means is provided with heating devices to increase the temperature of the transformer fluid and thus to increase the flow rate of transformer fluid through the treating vessel. Preferably the first conduit means is wrapped, at least in part, with appropriate thermal insulation to minimize temperature loss between the transformer and the treating vessel.

A transformer containing about 77 gallons of transformer fluid may have a top temperature of about 65 degrees C and a bottom temperature of about 25 degrees C. The residual content of the contaminant in the container should be less than 1.5% by volume of the liquid inventory. An appropriate treatment vessel will contain about 50 pounds of granular activated carbon. In a still further refinement of the invention, the granular activated carbon may be combined with appropriate molecular sieves which will selectively absorb any water which may be present in the transformer fluid.

The adsorption capacity of the treatment vessel should exceed the total content of the ingredient which is to be removed. For example, if one gallon of PCB is residual in the transformer inventory, then the activated carbon should have a capacity to absorb one gallon of PCB. Thus the system can operate effectively without attention throughout the life of the transformer and maintain the PCB content of the inventory below the allowable limit as the residual PCB leaches into the transformer fluid inventory.

In a further refinement of the invention, an appropriate in-line particulate filter is presented in the second conduit means to preclude transfer of any activated carbon or molecular sieve or other particulate treating material into the transformer. As an added safeguard a similar in-line particulate filter may be presented in the first conduit means to preclude any backwash of particulate treatment material which might occur during transformer shutdowns.

DESCRIPTION OF THE PREFERRED EMBODIMENTS

Figure 1:
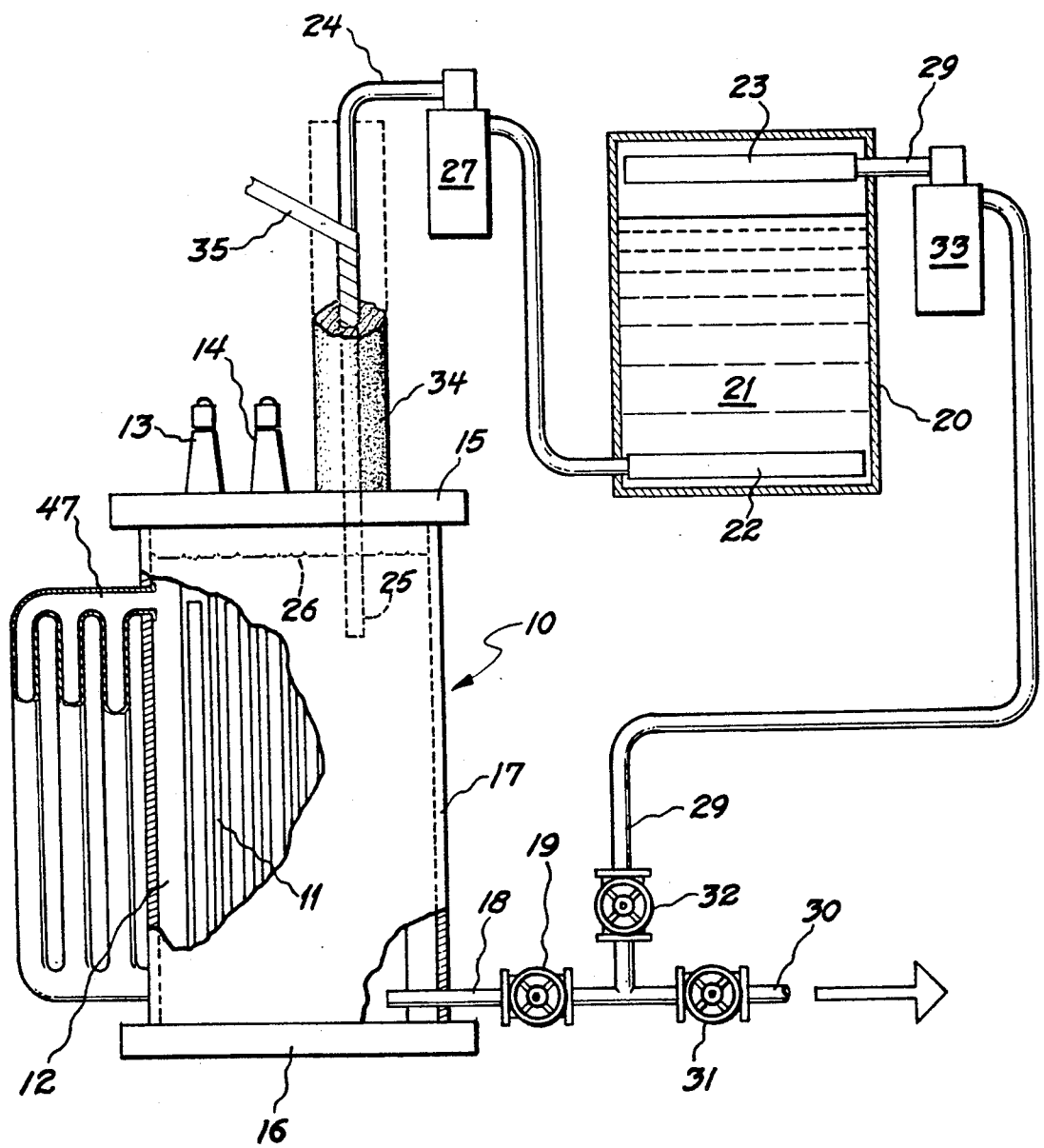
FIG. 1 is a cross-section illustration of a typical electrical transformer equipped with a treatment container according to this invention.

As shown in FIG. 1, a transformer 10 contains transformer coils 11 and a transformer fluid 12. Electrical terminals 13, 14 deliver electrical current from the transformer at a desired voltage. Other electrical terminals (not shown) receive electrical current at a different voltage. The transformer has a top wall 15, a bottom wall 16 and a side wall 17. Outlet pipes 18, 30 with appropriate valves 19, 31 are provided to drain the transformer fluid from the transformer when desired. Cooling fins 36 in a typical transformer help maintain a top-to-bottom temperature gradient in the fluid by allowing heat to radiate into the air surrounding the transformer.

A treatment vessel 20 according to the present invention contains an inventory of granular activated carbon 21 and a fluid distributor device 22 at one end and a fluid collector device 23 at the other end. A first conduit 24 joins the transformer 10 to the treatment vessel 20. The transformer end 25 of the first conduit 24 extends through the transformer top wall 15 and is positioned beneath but adjacent to the top level 26 of transformer fluid 12. The lower few inches of conduit 25 are preferably electrically non-conductive material to avoid electrical incidents if the conduit should inadvertently touch any electrically charged transformer components. The first conduit 24 connects the distributor 22 through a particulate filter 27. The collector device 23 is connected to a second conduit 29 to the outlet pipe 30. The fluid distributor 22 and the fluid collector 23 preferably are devices described in U.S. Pat. No. 4,379,750. A valve 32 is provided in the second conduit 29. A particulate filter 33 also is provided in the second conduit 29.

If the fluid collector 23 is disposed at a level above the bottom of the inventory of fluid 12, the treated liquid will flow by gravity to the transformer 10. So long as the temperature at the distributor 22 is greater than the temperature at the bottom of the transformer 12, the fluid will flow.

It will be observed that installation does not require draining all of the transformer fluid 12. By adding the pipe 30 and valve 31, the second conduit 29 can be brought in communication with the bottom of the transformer 10 through the existing valve 19 and pipe 18. The first conduit 24 enters into the transformer through an opening which is above the top level 26 of the transformer fluid 12; that opening is shown in the top wall 15 and is normally found there, but the opening could be in the side wall 17. The second conduit 29 may alternately reenter the transformer through the top wall 15 or the top of side wall 17 and extend to the bottom of the casing, but the fluid will not flow as efficiently.

The first conduit 24 preferably is covered with appropriate thermal insulation 34 and may be provided with an appropriate external heating means such as an electric heating tape 35.

In operation. the transformer fluid 12 within the transformer presents a thermal gradient, as the fluid adjacent to the top of the transformer 10 is substantially warmer than the fluid at the bottom of the transformer 10. A typical temperature differential is perhaps 25–40 degrees C. The open bottom 25 of the first conduit 24 is in communication with the warm transformer fluid near the top of the transformer 10 whereas the second conduit 29 communicates (with the valves 19, 32 open)

through conduits 30, 18 with the bottom of the transformer where the transformer fluid is relatively cool. The temperature differential provides a driving force promoting flow of transformer fluid 12 through the first conduit 24, the treatment vessel 20 and the second conduit 29.

Figure 2:
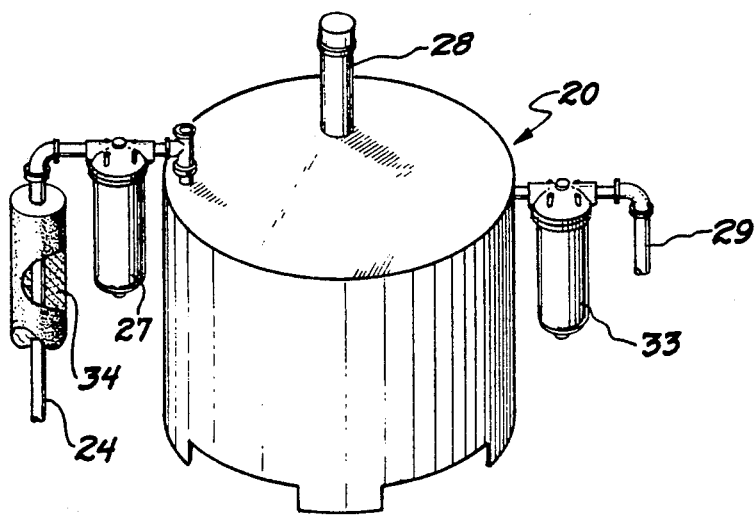
FIG. 2 is a perspective illustration of a typical treatment vessel.
Figure 3:
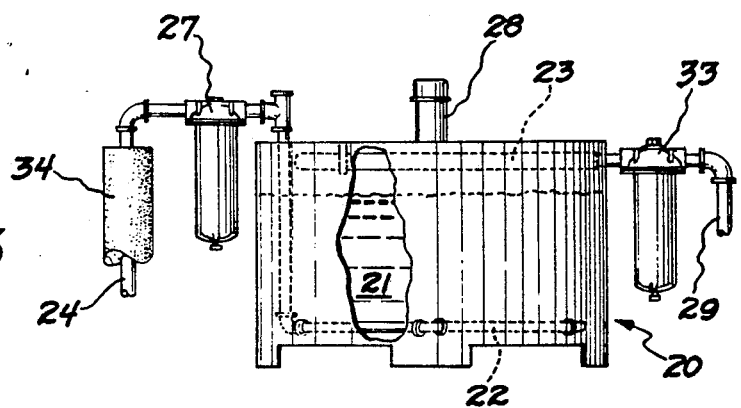
FIG. 3 is a side elevation view, partly in phantom outline, of the treatment vessel of FIG. 2 with appropriate filter devices.
Figure 4:
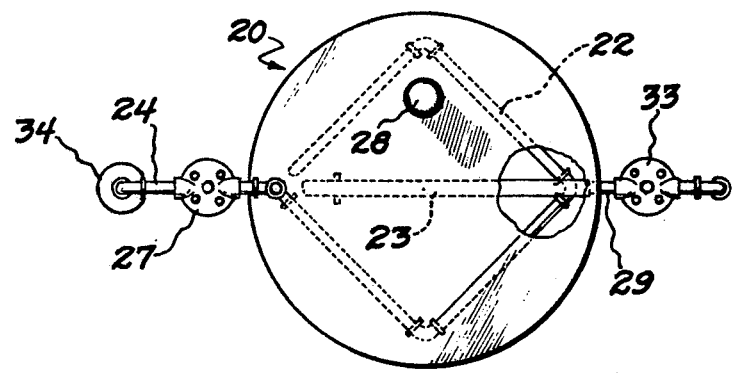
FIG. 4 is a plan view, partly in phantom outline, of the treatment vessel, as shown in FIG. 3.

An alternative embodiment of the treatment vessel 20 is illustrated in FIGS. 2, 3, 4. The first conduit 24 enters the treatment vessel 20 through a top wall and connects with a fluid distributor 22 which extends over the base of the treatment vessel 20 to provide uniform entry of transformer fluid into the activated carbon bed 21. A gas vent pipe 28 is provided in the top wall of the treatment vessel 20 to permit removal of any entrapped gases and to serve as a standpipe for transformer fluid.

The distributors 22 are illustrated near the base of the treatment vessel 20, and the collectors 23 are illustrated near the top of the treatment vessel 20. This arrangement is a preferred embodiment because the warm fluid from the first conduit 24 will tend to rise through the adsorbent 21. A down flow adsorbent bed 21 is also feasible, particularly if the treatment vessel volume compared to the fluid flow and temperature permits rapid cooling of fluid in the treatment vessel.

EXAMPLE

Consider a transformer containing 77 gallons of transformer fluid. A retrofill workman will remove the original PCB transformer fluid by draining the fluid from the transformer casing. Assume that 1 gallon of the PCB remains undrained in the casing and absorbed in the insulation. The retrofill workman thereafter fills the casing with an inert acceptable transformer fluid such as silicone and the PCB concentration is 1:77 parts by volume PCB or about 8,300 parts per million PCB by weight. However the actual circulating transformer fluid has a PCB content within a prescribed limit, e.g., less than 500 parts per million. The capacity of the treatment tank 20 should be sufficient to adsorb the residual PCB (1 gallon) as the PCB is released during the remaining life of the transformer. Fifty pounds of appropriate activated carbon 21 is sufficient to adsorb all of the residual PCB within the transformer casing (total about one gallon), while maintaining the PCB concentration of the transformer fluid below the prescribed limit.

The capacity of the treatment vessel 20 shall correspond to the residual PCB in the transformer. The adsorption capacity of activated carbon depends upon the equilibrium which is established between the adsorbed contaminant and the contaminant concentration in the recirculating fluid stream. Hence a treatment vessel containing 50 lbs of activated carbon may be adequate for maintaining the PCB limits of retrofilled large commercial transformers, e.g., 1200 to 1500 KVA capacity containing 200 to 300 gallons of transformer fluid.

When the operation of the treatment vessel depends solely on the temperature differential within the transformer, the return conduit 29 should communicate with a cool region, i.e., the bottom portion of the transformer. However when supplemental heat energy is supplied to the first conduit 24, by means of a heating tape 35, for example, then the return conduit 29 may communicate with the top portion of the transformer 10. Thus both conduits 24 and 29 may enter the transformer 10 through a top wall 15 when appropriate heating is provided for the first conduit 24.

Figure 5:
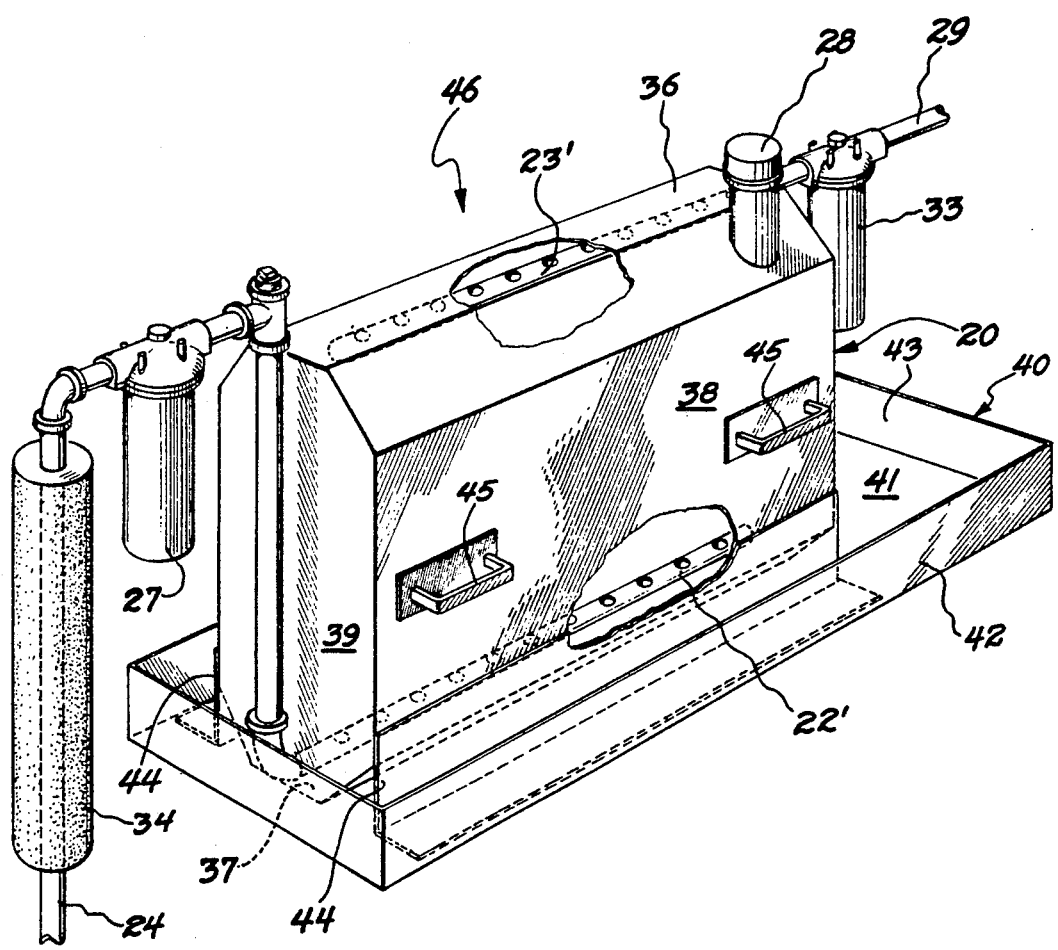
FIG. 5 is a perspective illustration of a preferred embodiment of a treatment vessel, partly in phantom outline.

FIG. 5 illustrates a preferred embodiment of the invention, a combined vessel-tray assembly 46. The treatment vessel 20 has a rectangular cross-section with a top wall 36, a bottom wall 37, side walls 38, and end walls 39. The first conduit 24 enters the treatment vessel 20 through the end wall 39. A bayonet-type distributor 22' is positioned near the bottom of the treatment vessel 20 and may be provided with perforations to distribute incoming fluid across the base of the treatment vessel 20. The second conduit 29 extends through an end wall 39 (not shown) and connects with a bayonet-type collector 23' having plural perforations to receive treated fluid. The treatment vessel 20 is mounted in a tray 40 having a base 41, side walls 42 and end walls 43. The volume of the tray 40 is sufficient to contain the entire liquid inventory of the treatment vessel 20. A supply of treatment solids (particulate activated carbon, molecular sieves, etc.) substantially entirely fills the interior of the treatment vessel 20. Hence the liquid volume of the treatment vessel 20, excluding adsorbent pore volume from which liquids would not drain, is only the inter particle volume, less than 50% of the actual volume of the treatment vessel 20. In a typical installation according to FIG. 5, the tray 40 is 34"×14" and the side walls 42 and end walls 43 are about 2" high. The treatment vessel 20 is about 26"×8" at its base and is about 18" high. The total volume of the treatment vessel 20 is about 2 cubic feet.

The vessel 20 is secured to the tray 40 by welded or bolted brackets 44 which join each side wall 38 to the tray base 41. Handles 45 may be welded to the side walls 38 to facilitate transportation of the vessel-tray assembly 46.

A flow rate through the treatment vessel 20 should be sufficient to circulate the entire transformer fluid inventory in about 5 to 50 days, preferably about 10 days.

The treatment vessel 20 usually will be filled with appropriate adsorbent prior to shipment. The described treatment vessel will hold about 45–52 pounds of prewetted activated carbon. The treatment vessel 20 preferably is filled with silicone prior to shipment, about 10 to 15 gallons. The total filled weight of the described unit is about 215 pounds.

Liquid flow equalizing baffles (not shown) may be provided within the treatment vessel to promote uniform liquid flow through the treatment vessel.

A primary advantage of this invention is that the system operates unattended; and if the optional heating element for the first conduit is not in use, the system requires no power. The optional heating element permits the system to operate even when the transformer is not operating or to achieve more rapid flow with transformers operating at less than capacity.

The overall system is relatively small, inconspicuous, inexpensive, maintenance-free, easily installed without draining the transformer, and requires little power (preferably none). The treatment vessel preferably is mounted on top of the transformer. Note that both top and side mounts use the described delivery and return piping. Thus the termal siphon does not compete with the preexisting cooling fins 47 (FIG. 1). If the first and second conduits were connected in place of a cooling fin or through connections at the same elevations as the cooling fins, the thermal siphon would experience little natural flow due to its greater back pressure).

I claim:

1. A liquid treatment apparatus for removing an ingredient from a liquid inventory in a container, said liquid inventory having a vertical thermal gradient between its top and its bottom, said ingredient comprising a minor volume of said inventory, comprising:
- a treatment vessel, containing treating material adapted to remove said ingredient from said liquid;
- a first conduit extending upwardly from said liquid inventory to said treatment vessel, a first open end of said first conduit communicating at its bottom end with said liquid inventory beneath and adjacent to the top level of said inventory;
- distribution means within said treatment vessel for distributing liquid containing said ingredient from said first conduit into the said treatment vessel;
- collection means in said treatment vessel for withdrawing treated liquid which has passed through said treating material and which contains a lower concentration of said ingredient than said inventory;
- a second conduit communicating with said collection means and the inventory to return treated liquid to said inventory.

2. The liquid treatment apparatus of claim 1 including an in-line particle filter means in said first conduit to prevent said treatment material from entering said inventory.

3. The liquid treatment apparatus of claim 1 including an in-line particle filter means in said second conduit to prevent said treatment material from entering said inventory.

4. The liquid treatment apparatus of claim 1 wherein thermal insulating material covers a portion of said first conduit to retard heat loss.

5. The liquid treatment apparatus of claim 1 including heating means independent of and outside of said container for heating said first conduit and its contents.

6. The liquid treatment apparatus of claim 1 wherein said container has a valved outlet pipe adjacent to the bottom of said container and said second conduit communicates with the bottom of said valved outlet pipe to provide a flow path for said liquid from said treatment vessel to the bottom of said inventory.

7. The liquid treatment apparatus of claim 1 wherein said container is a transformer casing; said liquid is a coolant/insulator liquid; said ingredient is PCB; and said treating material is activated carbon.

8. The liquid treatment apparatus of claim 1 wherein said treatment vessel is mounted within a tray having sufficient volume to confine the liquid contents of said vessel in the space between said tray and said vessel.

9. The liquid treatment apparatus of claim 8 wherein said treatment vessel is joined to said tray by brackets secured to said vessel and secured to said tray.

10. A liquid treatment apparatus for use with a transformer having a casing with walls, said casing containing residual PCB as a minor ingredient of its transformer liquid inventory, including:
- a treatment vessel containing a supply of particulate activated carbon;
- an inlet liquid distributor in said vessel connected through a wall of said vessel to a first conduit;
- an outlet liquid collector in said vessel connected through a wall of said vessel to a second conduit;
- said first conduit communicating through a wall of said casing above said inventory with the top portion of said inventory;
- said second conduit communicating through a wall of said casing with said inventory;
- heating means independent of and outside of said casing for heating said first conduit and its contents;
- whereby a portion of said inventory continuingly flows through said first conduit, said treatment vessel and said second conduit as a result of the temperature differential existing between said first conduit and said second conduit.

11. The liquid treatment apparatus of claim 10 including an in-line particle filter in said first conduit to prevent movement of particles from said treatment vessel to said transformer through said first conduit.

12. The liquid treatment apparatus of claim 10 including an in-line particle filter in said second conduit to prevent movement of particles from said treatment vessel to said transformer through said second conduit.

13. The liquid treatment apparatus of claim 10 in which said distributor means is adjacent to the bottom of said vessel and said collector means is adjacent to the top of said vessel.

14. The liquid treatment apparatus of claim 10 including a gas relief conduit extending through a top wall of said vessel.

15. The liquid treatment apparatus of claim 10 including thermal insulation means surrounding at least a portion of said first conduit to retain heat in said first conduit and its contents.

16. The liquid treatment apparatus of claim 10 including thermal insulation means covering said first conduit to retain thermal energy in said first conduit and its contents.

17. The liquid treatment apparatus of claim 10 wherein said heating means comprises electric heating elements.

18. The liquid treatment apparatus of claim 10 wherein said casing has a valved outlet pipe adjacent to its base for discharging said liquid inventory from said casing and wherein said second conduit communicates with said valved outlet pipe to provide a flow path for said liquid from said treatment vessel to the bottom of said inventory.

* * * * *